US011132900B2

(12) United States Patent
Bender et al.

(10) Patent No.: US 11,132,900 B2
(45) Date of Patent: Sep. 28, 2021

(54) VEHICULAR PARKING LOCATION IDENTIFICATION (71) Applicant: INTERNATIONAL BUSINESS MACHINES CORPORATION, Armonk, NY (US)

(72) Inventors: Michael Bender, Rye Brook, NY (US); Craig M. Trim, Ventura, CA (US); Kedar Daptardar, Naugatuck, CT (US); Alekh R. Shah, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 16/183,893

(22) Filed: Nov. 8, 2018

(65) Prior Publication Data
US 2020/0152062 A1 May 14, 2020

(51) Int. Cl.
B60W 30/06 (2006.01)
B62D 15/02 (2006.01)
G05D 1/02 (2020.01)
G08G 1/01 (2006.01)
G08G 1/017 (2006.01)
G08G 1/14 (2006.01)

(52) U.S. Cl.
CPC ............ *G08G 1/146* (2013.01); *B60W 30/06* (2013.01); *G05D 1/0212* (2013.01); *G05D 1/0231* (2013.01)

(58) Field of Classification Search
CPC . B62D 15/0285; B62D 15/027; B60W 30/06; G05D 1/0212; G05D 1/0231; G08G 1/146; G08G 1/0175; G08G 1/0112; G08G 1/143

USPC .......................................................... 701/23
See application file for complete search history.

(56) References Cited

U.S. PATENT DOCUMENTS

| 9,418,552 | B2 | 8/2016 | Korman | |
|---|---|---|---|---|
| 9,581,997 | B1* | 2/2017 | Penilla | G05D 1/0011 |
| 2014/0132767 | A1 | 5/2014 | Sonnabend | |
| 2015/0346727 | A1* | 12/2015 | Ramanujam | B62D 15/0285 701/23 |
| 2016/0155332 | A1 | 6/2016 | Wang | |

(Continued)

OTHER PUBLICATIONS

Smoothparking app; https://smoothparking.com/; retrieved from the Internet Sep. 5, 2018; 1 page.

Primary Examiner — Ian Jen
Assistant Examiner — Hossam M Abd El Latif
(74) Attorney, Agent, or Firm — Schmeiser, Olsen & Watts; Brian M. Restauro (57) ABSTRACT A method and system for enabling a vehicular parking location identification improvement process is provided. The method includes generating a first database comprising parking locations associated with specified regulations. Parking requirement data associated with parking requirements of a driver of a vehicle at an initial location is received and a second database comprising revised parking locations is generated. Recommended parking locations are generated based on analysis of the first database the said second database and a selection for a parking location of the recommended parking locations is received. The driver is directed from the initial location to the parking location and movement of the vehicle from the initial location to parking location is monitored via sensors.

13 Claims, 9 Drawing Sheets (56) References Cited

U.S. PATENT DOCUMENTS

| | | |
|---|---|---|
| 2017/0098376 A1 | 4/2017 | Wang |
| 2017/0278023 A1 | 9/2017 | Rosen |
| 2017/0287330 A1 | 10/2017 | Tsyrklevich |
| 2018/0053237 A1* | 2/2018 | Hayes .................. G08G 1/0141 |
| 2018/0065624 A1* | 3/2018 | Dudar .................... G07B 15/02 |
| 2018/0276700 A1* | 9/2018 | Wang ................. G06Q 30/0217 |
| 2020/0184278 A1* | 6/2020 | Zadeh .................... G06F 16/953 |

* cited by examiner

VEHICULAR PARKING LOCATION IDENTIFICATION

FIELD

The present invention relates generally to a method for automatically identifying vehicular parking locations and in particular to a method and associated system for improving automotive technology by directing vehicles to specified parking locations and monitoring associated vehicular movement.

BACKGROUND

Typical processes for determining conditions for vehicular parking include usage of parking lot attendants, lighting structures indicating available parking spaces, and entrance point counters indicating available parking spaces. Addressing specific vehicular parking issues typically require human intervention for controlling traffic flow into a parking structure. Additionally, directing vehicles to specified regions for parking may require additional human intervention.

SUMMARY

A first aspect of the invention provides a method comprising: generating, by a processor of a hardware device, a first database comprising parking locations associated with specified parking permits, parking regulations, and associated time periods; receiving, by the processor, parking requirement data associated with parking requirements of a driver of a vehicle at an initial location; generating, by the processor, a second database comprising revised parking locations and GPS coordinates associated with the parking requirement data with respect to the parking locations; generating, by the processor based on analysis of the first database and the second database, recommended parking locations for the driver; receiving, by the processor from the driver, a selection for a first parking location of the recommended parking locations; directing, by the processor, the driver from the initial location to the first parking location; monitoring, by the processor via sensors of the vehicle, movement of the vehicle from the initial location to the first parking location.

A second aspect of the invention provides a computer program product, comprising a computer readable hardware storage device storing a computer readable program code, the computer readable program code comprising an algorithm that when executed by a computer processor of a hardware device implements a method, the method comprising: generating, by the processor, a first database comprising parking locations associated with specified parking permits, parking regulations, and associated time periods; receiving, by the processor, parking requirement data associated with parking requirements of a driver of a vehicle at an initial location; generating, by the processor, a second database comprising revised parking locations and GPS coordinates associated with the parking requirement data with respect to the parking locations; generating, by the processor based on analysis of the first database and the second database, recommended parking locations for the driver; receiving, by the processor from the driver, a selection for a first parking location of the recommended parking locations; directing, by the processor, the driver from the initial location to the first parking location; monitoring, by the processor via sensors of the vehicle, movement of the vehicle from the initial location to the first parking location.

A third aspect of the invention provides a hardware device, within a vehicle, comprising a computer processor coupled to a computer-readable memory unit, the memory unit comprising instructions that when executed by the computer processor implements a method comprising: generating, by the processor, a first database comprising parking locations associated with specified parking permits, parking regulations, and associated time periods; receiving, by the processor, parking requirement data associated with parking requirements of a driver of a vehicle at an initial location; generating, by the processor, a second database comprising revised parking locations and GPS coordinates associated with the parking requirement data with respect to the parking locations; generating, by the processor based on analysis of the first database and the second database, recommended parking locations for the driver; receiving, by the processor from the driver, a selection for a first parking location of the recommended parking locations; directing, by the processor, the driver from the initial location to the first parking location; monitoring, by the processor via sensors of the vehicle, movement of the vehicle from the initial location to the first parking location.

The present invention advantageously provides a simple method and associated system capable of determining conditions for vehicular parking attributes.

DETAILED DESCRIPTION

Figure 1:
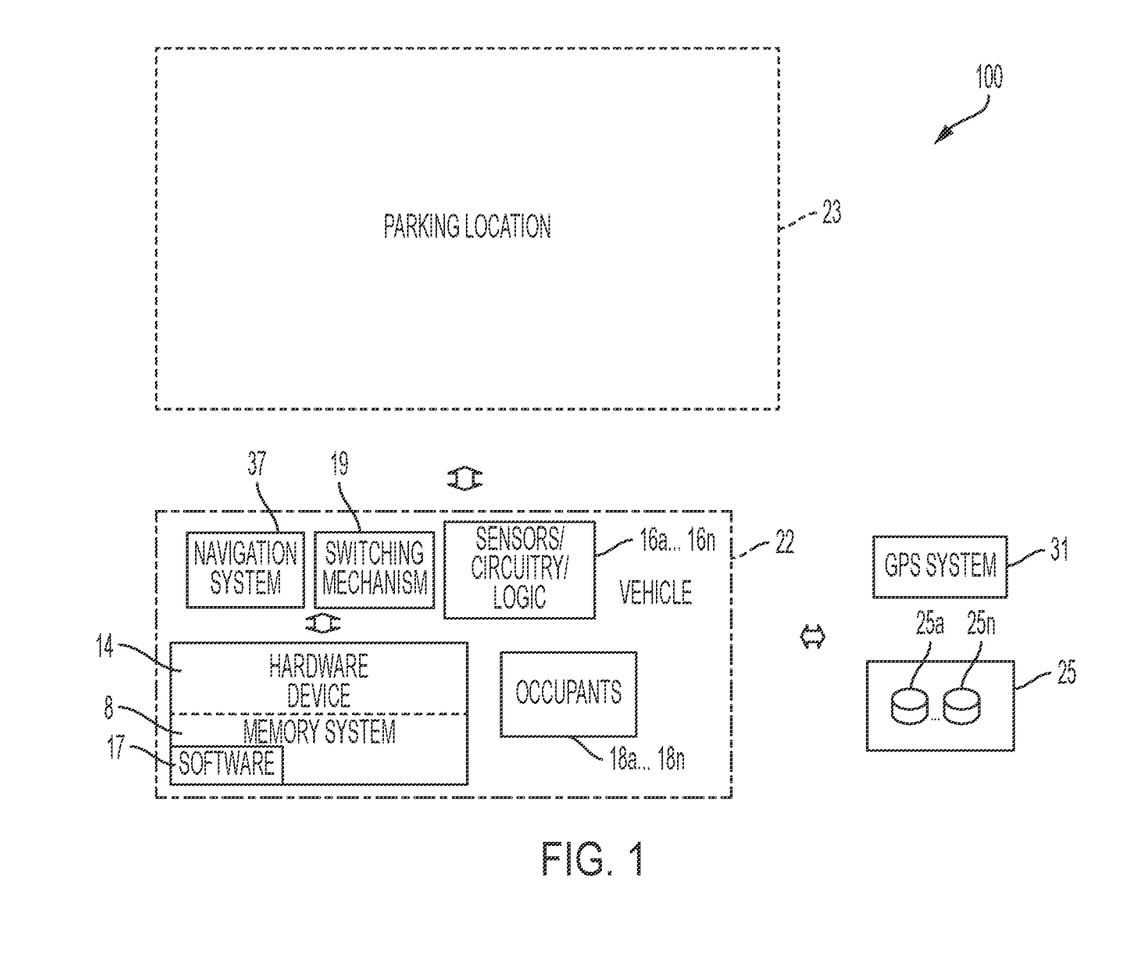
FIG. 1 illustrates a system for improving automotive technology by determining a parking location, directing vehicles to the parking locations, and monitoring associated vehicular movement, in accordance with embodiments of the present invention.

FIG. 1 illustrates a system 100 for improving automotive technology by determining a parking location, directing vehicles to the parking locations, and monitoring associated vehicular movement, in accordance with embodiments of the present invention. With respect to typical parking scenarios, it is often difficult to locate a permissible parking spot where an individual will not receive a parking citation or where a vehicle is not subject to being towed. The aforementioned issues are compounded with every municipality having different parking regulations with respect to, inter alia, a distance to driveways, bus stops, fire hydrants, etc. and how associated information is shared with the general public. The aforementioned issues may be compounded again with different regulations for parking, standing, loading zones, or taxi stands. Additionally, there may be different enforcement standards with respect to different geographical locations. Therefore, system 100 is enabled to address the aforementioned issues by executing a process for generating a database system 25 for determining possible parking spaces by ingesting local regulations and learning associated rules via execution of natural language processing (NLP) code. Additionally, system 100 uses crowd sourced images from vehicular cameras to identify physical objects and signs that restrict parking areas. The crowd sourced images are then processed via the NLP code and combined with associated GPS locations to determine the ineligible parking spots. Resulting data is entered into mapping programs to create a street view overlay for identifying parking spaces for potential parking.

Once a vehicle (e.g., vehicle 22 in FIG. 1) is parked, system 100 enables a warning specifying risks associated with the vehicle being parked. The warning may be enhanced with a running clock to determine when the vehicle must be moved. Additionally, a self-driving vehicle may be activated to move itself when a location is no longer suitable for parking thereby initiating motion to a different location based on determined available locations. Alternatively, the self-driving vehicle may be activated to maintain motion until a suitable parking location is detected. Additionally, the warning may include determination of an amount of travel time for locating the vehicle.

System 100 is configured to analyze multiple inputs to determine a probability of receiving a citation for a given parking location based on: ingesting public records, analysis of historical citations, and a length of time that the vehicle has been parked at a single location based via analysis of multiple images of the vehicle.

System 100 enables the following functionality:

1. Creating a database system 25 comprising permissible parking locations for different categories of vehicles based on a cognitive analysis of regulations and images from crowd sourced vehicular cameras.

2. Enabling database system 25 for identifying parking locations suitable for a class of vehicles based on an expected parking timeframe. Additionally, database system 25 may be leveraged by a self-driving vehicle for initiating movement prior to violating a regulation.

3. Supplementing the database system 25 with a probability of enforcement of a regulation for a given location via analysis from crowd sourced vehicles.

System 100 of FIG. 1 includes a global positioning satellite (GPS) system 31 (or any type of movement detection system) and a database system 25 (including databases 25*a* . . . 25*n*) communicatively connected (e.g., via a network) to a vehicle 22. The vehicle 22 includes a hardware device 14 (e.g., an onboard computer), a switching (control) mechanism 19, sensors/circuitry/logic 16*a* . . . 16*n*, a navigation system 37, and occupants 18*a* . . . 18*n*. Vehicle 22 is configured to be directed to a parking location 23 based on determined parking attributes. Hardware device 14, navigation system 37, and switching mechanism 19 may include any type of hardware controller system(s) including, inter alia, an automobile integrated controller computer, a computer (PC), a laptop computer, a tablet, etc. Hardware device 14 includes a memory system 8. Memory system 8 stores program instructions 17 for enabling a process for determining and executing parking control actions. Hardware device 14, navigation system 37, and switching mechanism 19 may each comprise a specialized hardware device comprising specialized (non-generic) hardware and circuitry (i.e., specialized discrete non-generic analog, digital, and logic-based circuitry) for executing a process described with respect to FIGS. 1-9. The specialized discrete non-generic analog, digital, and logic-based circuitry may include proprietary specially designed components (e.g., a specialized integrated circuit, such as for example an Application Specific Integrated Circuit (ASIC) designed for only implementing a process for improving automotive technology by determining parking location, directing vehicles to the parking locations, and monitoring associated vehicular movement). Switching mechanism 19 comprises any type of electrical and/or mechanical control and switching mechanism (for automatically controlling driving functionality of vehicle 22) that may include proprietary specially designed electro/mechanical components (e.g., circuitry, switching relay, control motors, etc.). Sensors/circuitry/logic 16*a* . . . 16*n* may include, inter alia, optical sensors, temperature sensors, infrared sensors, speed sensors, GPS sensors, moisture sensors, pressure sensors, motion detector sensors, video cameras, etc.

The following process enabled by system 100 of FIG. 1 describes an implementation example for identifying potential parking spaces and reducing associated parking risks within an unauthorized location:

The process is initiated when a database of permissible spots is generated based on a type of parking permit of a driver and a current time. Generating the database may include: ingesting local regulations and processing the regulations via execution of NLP code; creating a database associated with traffic control sign by ingesting local video streams from vehicular cameras; using image and NLP processing of the video streams to identify the signs and physical structures impacting potential parking spaces; and generating a GPS defined database of parking spaces based on a current time of date and special parking permits. Additionally, a risk database associated with parking at different locations is generated. The databases and additional information are analyzed, and specified parking spaces are recommended for the driver. The additional information may include: captured vehicle and Webcam generated video; calendar events or NLP processing of audio requests; identified locations determined based on processing video from vehicular feeds; identified tow-trucks at a specific location; and potential parking spaces detected from an analysis of vehicular feeds.

Figure 2:
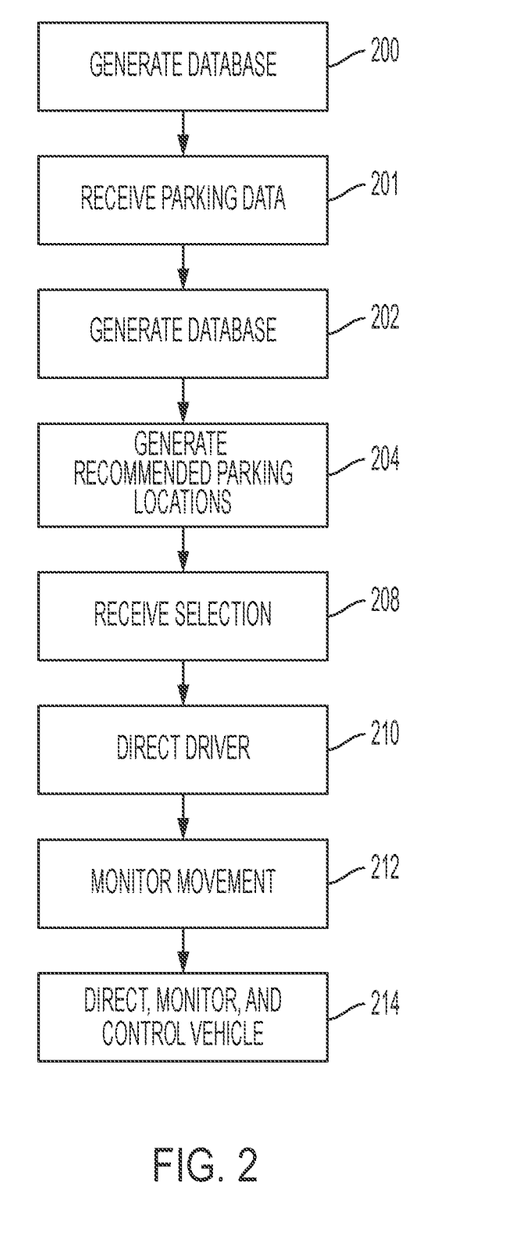
FIG. 2 illustrates a flowchart detailing a process enabled by the system of FIG. for improving automotive technology by determining a parking location, directing vehicles to the parking locations, and monitoring associated vehicular movement, in accordance with embodiments of the present invention.

FIG. 2 illustrates a flowchart detailing a process enabled by system 100 of FIG. 1 for improving automotive technology by determining a parking location, directing vehicles to the parking locations, and monitoring associated vehicular movement, in accordance with embodiments of the present invention. Each of the steps in the algorithm of FIG. 2 may be enabled and executed in any order by a computer processor executing computer code. In step 200, a first database comprising parking locations associated with specified parking permits, parking regulations, and associated time periods is generated. In step 201, parking requirement data associated with parking requirements of a driver of a vehicle at an initial location is received for processing. In step 202, a second database (comprising revised parking locations and GPS coordinates associated with the parking requirement data with respect to the parking locations) is generated. Generating the second database may include: receiving data comprising local parking regulations; executing natural language processing (NLP) code with respect to the data; receiving (from a plurality of video retrieval devices) video data associated with the parking locations; identifying (from the video data) signs and physical structures impacting the parking locations; analyzing the video data; and determining parking risks associated with local parking enforcement authorities.

In step 204, recommended parking locations for the driver are generated based on analysis of the first database and the second database. Recommended parking locations may include parking spaces or parking areas associated with a vehicle type, a vehicle size, a time of day, weather related issues, town parking regulations, etc. The recommended parking locations may be visually or audibly presented (with associated risks for recommended parking locations) to the driver so that the driver may review all associated risks for assessment with respect to accepting or declining the recommended parking locations. In step 208, a selection for a first parking location of the recommended parking locations is received. The first parking location may alternatively be selected from currently available parking spaces of the recommended parking locations. The currently available parking spaces may be detected by: receiving and analyzing video data associated with the parking locations. Additionally, tow vehicles at the recommended parking locations and risk levels associated with the recommended parking locations may be identified for identifying the currently available parking spaces.

In step 210, the driver is directed from the initial location to the first parking location. The driver may be directed by a GPS system audibly and visually directing the driver based on feedback from the vehicle. Alternatively, the driver may be directed via usage of an IoT device presenting parking directions. In step 212, movement of the vehicle from the initial location to the first parking location is monitored via sensors of the vehicle. In step 214, the driver is directed into a specified parking space at the first parking location. Additionally, the driver moving into the specified parking space is monitored. The driver may be directed into the specified parking space via usage of GPS technology (to direct the driver to an approximate location of the specified parking space) in combination with optical sensors for detecting reflectors or alternative boarder attributes (e.g., painted lines) associated with a parking space. The optical sensors may additionally be configured to detect additional vehicle at the parking location within the parking spaces to avoid possible collisions. Additionally, the vehicle may comprise a self-driving vehicle and be automatically controlled such that the vehicle automatically initiates motion and parks in the specified parking space at the first parking location. Alternatively, the risk levels (of step 208) may be determined to exceed a specified risk level threshold and the self-driving vehicle may be automatically instructed to: travel to a second location of the recommended parking locations; travel to a specified parking space of the first location; travel within a perimeter of the first location during a first specified time period; or notify the driver to avoid parking at the first location.

Figure 3:
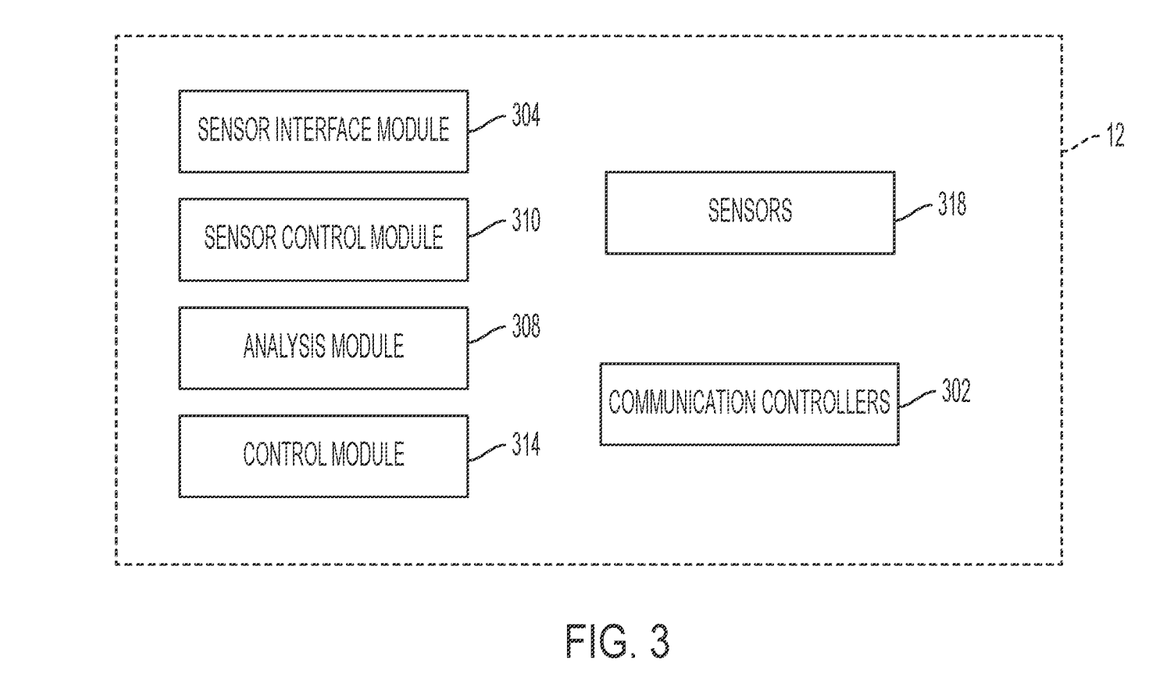
FIG. 3 illustrates an internal structural view of the sensors/circuitry/logic of FIG. 1, in accordance with embodiments of the present invention.

FIG. 3 illustrates an internal structural view of sensors/circuitry/logic 16*a* . . . 16*n* of FIG. 1, in accordance with embodiments of the present invention. Sensors/circuitry/logic 16*a* . . . 16*n* includes sensors 318, a sensor interface module 304, a sensor control module 310, an analysis module 308, a control module 314, and communication controllers 302. Sensors 318 may include any type of internal or external sensors including, inter alia, optical sensors, temperature sensors, infrared sensors, speed sensors, GPS sensors, moisture sensors, pressure sensors, motion detector sensors, video cameras, etc. Sensor interface module 304 comprises specialized hardware and software for controlling all functions related to interfacing with sensors 16*a* . . . 16*n*. Sensor control module 310 comprises specialized hardware and software for controlling all functionality related to controlling all functions related to control of 16*a* . . . 16*n* and implementing the process described with respect to the algorithm of FIG. 2. Analysis module 308 comprises specialized hardware and software for controlling all functions related to step 204 of FIG. 2. Control module 314 comprises specialized hardware and software for controlling (in combination with hardware device) functions related to executing vehicle control actions with respect to auto drive features as described, supra. Communication controllers 502 are enabled for controlling all communications between sensors 318, sensor interface module 304, sensor control module 310, analysis module 308, and control module 314.

Figure 4:
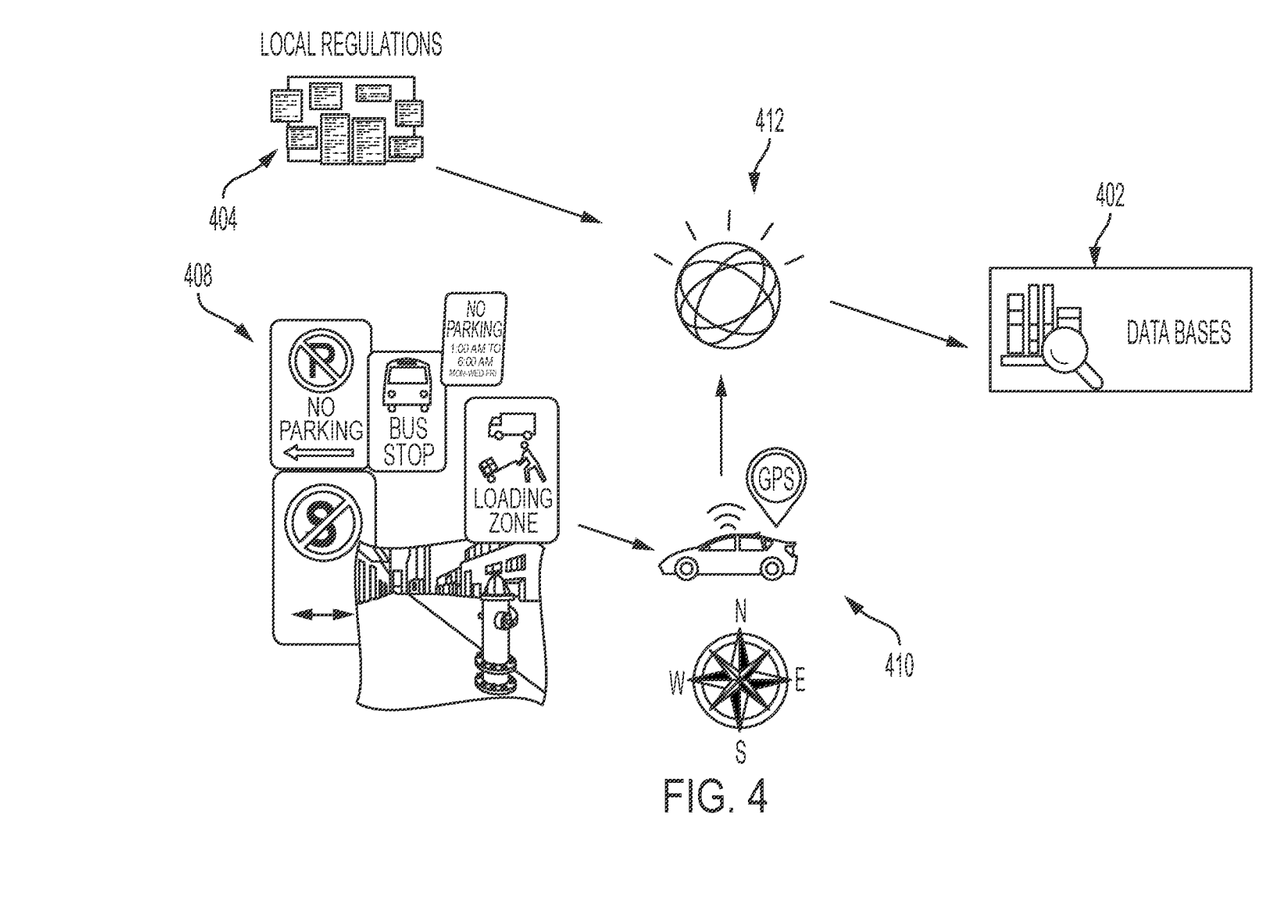
FIG. 4 illustrates an implementation example associated with generating databases as described in steps of FIG. 2, in accordance with embodiments of the present invention.

FIG. 4 illustrates an implementation example associated with generating databases 402 as described in steps 200 and 202 of FIG. 2, in accordance with embodiments of the present invention. The example illustrates a crowd sourced vehicle 410 capturing images while driving past items 408 (i.e., signs, hydrants, driveways, and corners) associated with regulations 404 of a corpus. A system 400 ingests the regulations to create a corpus associated with parking locations and associated distances. Likewise, the captured images from vehicle 410, a GPS location, a location of an associated camera (front/back), a direction (with respect to a side of the road associated with a sign) are transmitted to a server 412 for analysis. Words, arrows, and objects are identified with respect to local standards for signs for generating a database 402. The database 402 comprises locations, restricted parking times for locations, and associated parking exceptions (e.g., a special parking permit, taxi stands, commercial vehicles, etc.) for an associated location.

Figure 5:
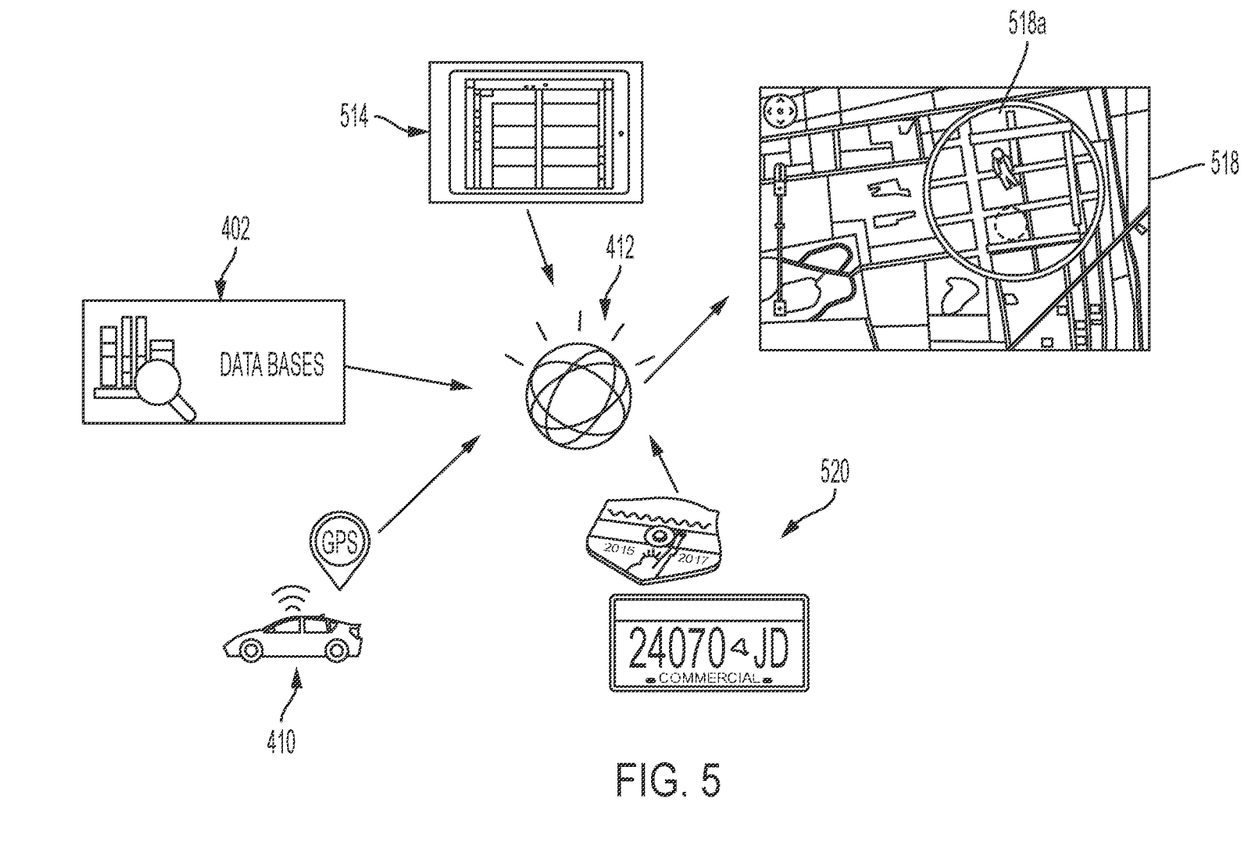
FIG. 5 illustrates an implementation example associated with locating allowable parking spaces based on analysis of databases of FIG. 4, in accordance with embodiments of the present invention.

FIG. 5 illustrates an implementation example associated with locating allowable parking spaces based on analysis of databases 402 of FIG. 4, in accordance with embodiments of the present invention. Databases 402 are used for input into server 412 for vehicle 410 searching for parking location/space. The process is initiated when a location and direction of travel of vehicle 410 are transmitted to server 412. Exceptions and conditions (for parking) are transmitted to server 412 for filtering parking locations. Additionally, a user calendar 514 is analyzed to determine a probable desired parking timeframe. Alternatively, a self-driving vehicle may be associated with an overlay illustrating where vehicle 22 may be initially parked. An additional command may be issued for locating future parking location/spaces or to continuously drive to avoid a parking issue. All activities of vehicle 410 are monitored for generating an overlay 518*a* with respect to a mapping presentation 518. For example, if vehicle 410 is not moving, server 412 may overlay and present locations associated with a no standing regulation.

Figure 6:
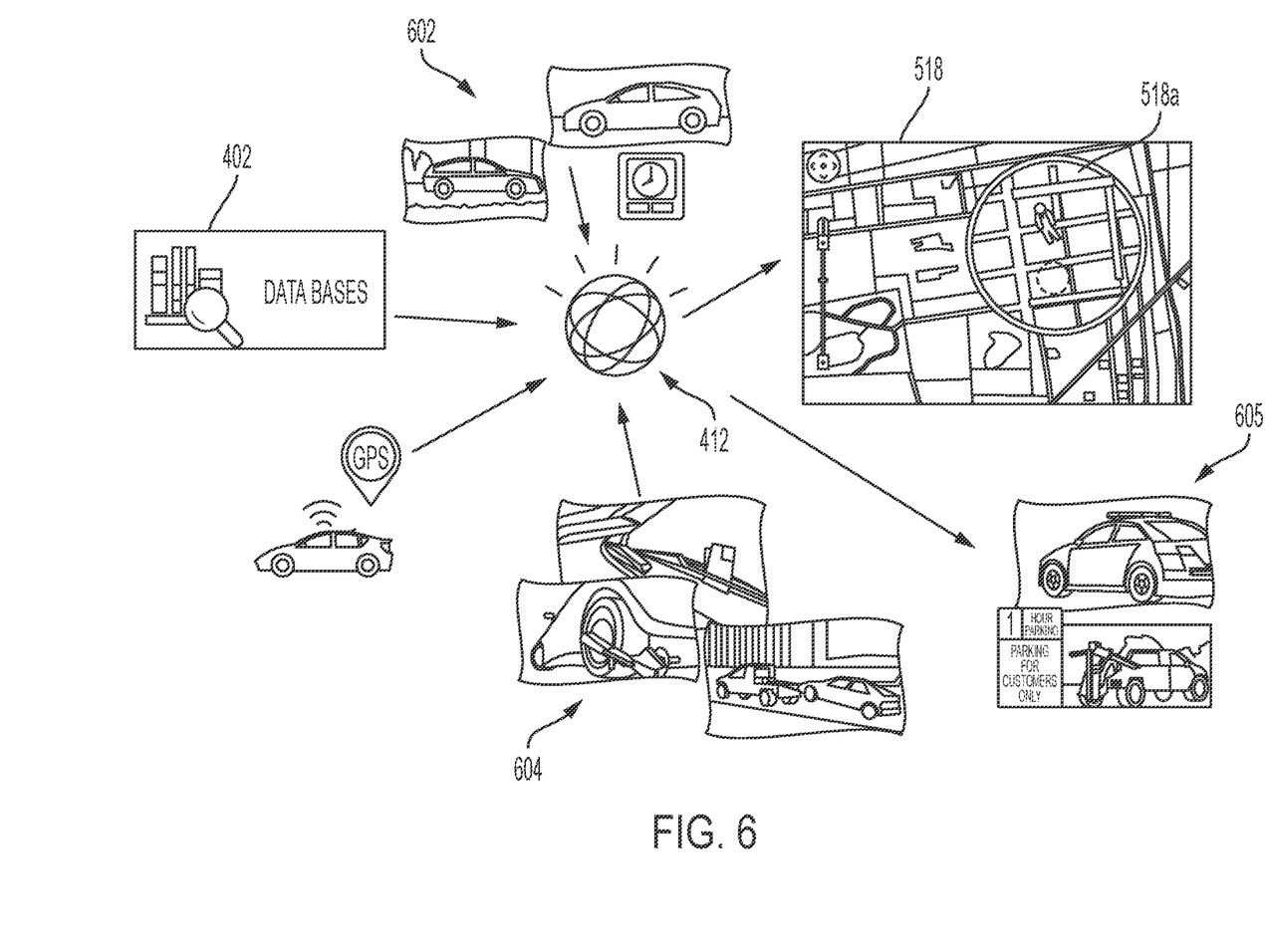
FIG. 6 illustrates an implementation example associated with locating risks associated with specified parking location/spaces determined in FIG. 5, in accordance with embodiments of the present invention.

FIG. 6 illustrates an implementation example associated with locating risks associated with specified parking location/spaces determined in FIG. 5, in accordance with embodiments of the present invention. Databases 402 are used for input into server 412 for vehicle 410 for identifying parking locations associated with higher or lower levels of risk associated with parking improperly. The process is initiated when a location and direction of travel of vehicle 410 are transmitted to server 412. Additionally, images 604 (illustrating parking enforcement) and images 602 (illustrating lack of parking enforcement) are be transmitted to server 412. In response, overlay 518a mat be presented with respect to mapping presentation 518 to illustrate a risk of parking enforcement at any given time.

Figure 7:
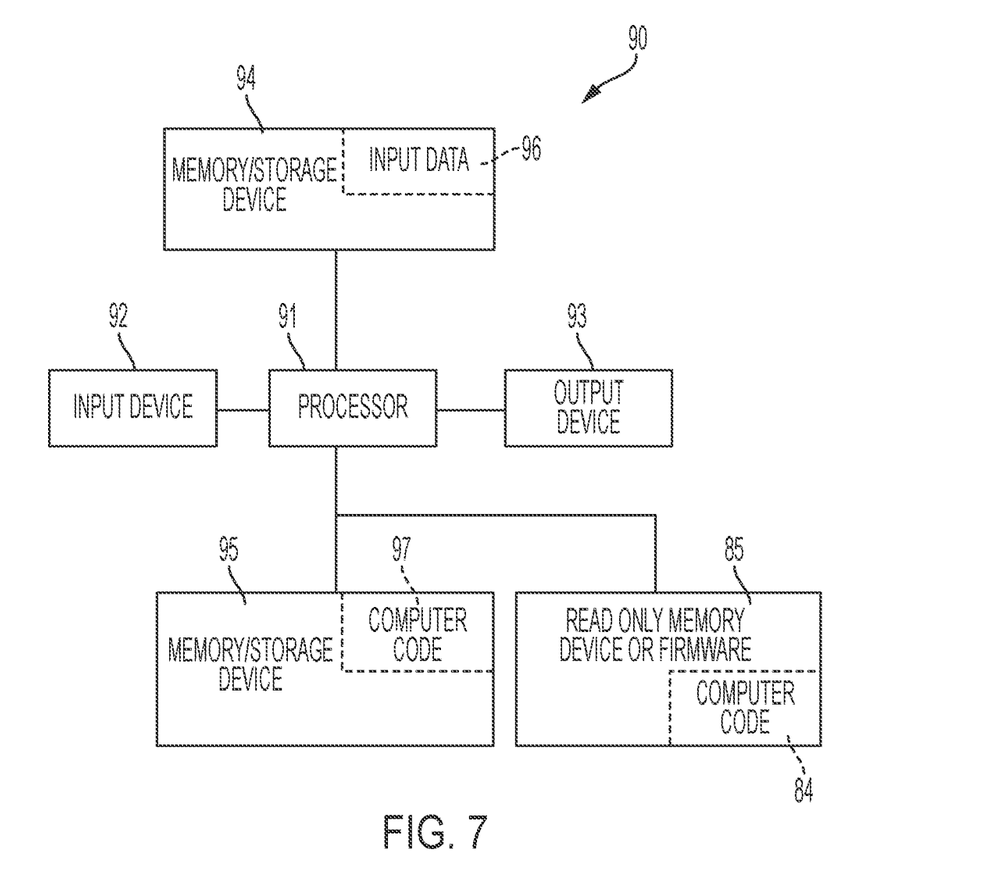
FIG. 7 illustrates a computer system for improving automotive technology by determining a parking location, directing vehicles to the parking locations, and monitoring associated vehicular movement, in accordance with embodiments of the present invention.

FIG. 7 illustrates a computer system 90 (e.g., hardware device 14) for improving automotive technology by determining a parking location, directing vehicles to the parking locations, and monitoring associated vehicular movement, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving automotive technology by determining a parking location, directing vehicles to the parking locations, and monitoring associated vehicular movement. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve automotive technology by determining a parking location, directing vehicles to the parking locations, and monitoring associated vehicular movement. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving automotive technology by determining a parking location, directing vehicles to the parking locations, and monitoring associated vehicular movement. In another embodiment, the invention provides a business method that performs the process steps of the invention on a subscription, advertising, and/or fee basis. That is, a service supplier, such as a Solution Integrator, could offer to improve automotive technology by determining a parking location, directing vehicles to the parking locations, and monitoring associated vehicular movement. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
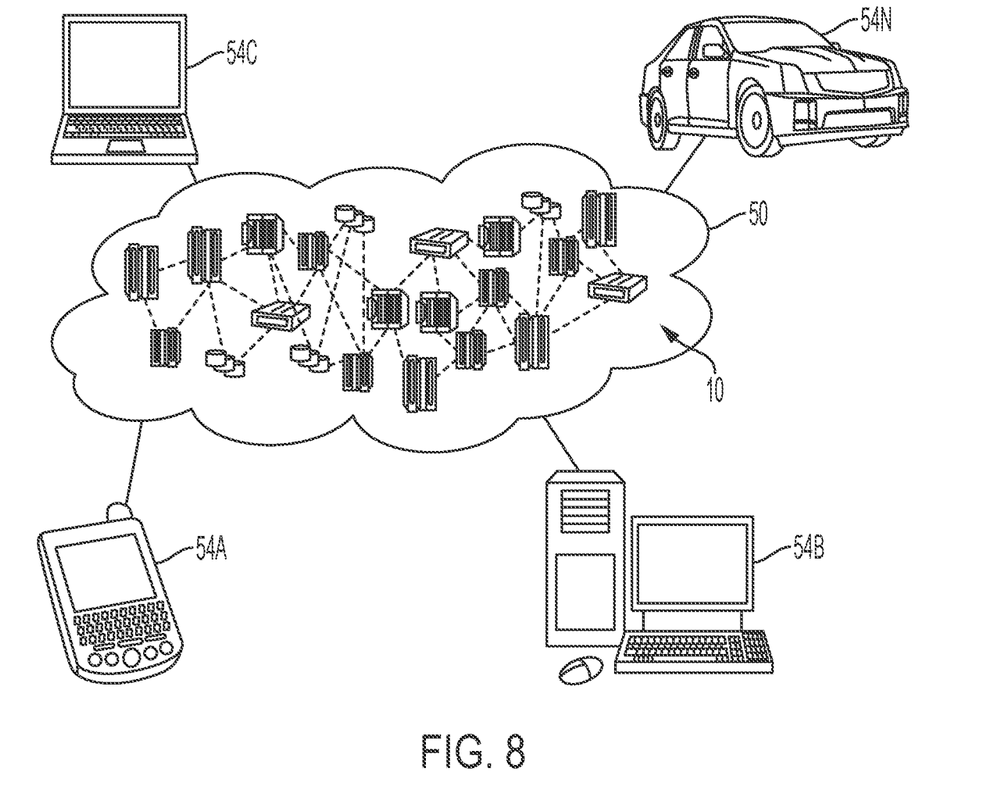
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 9:
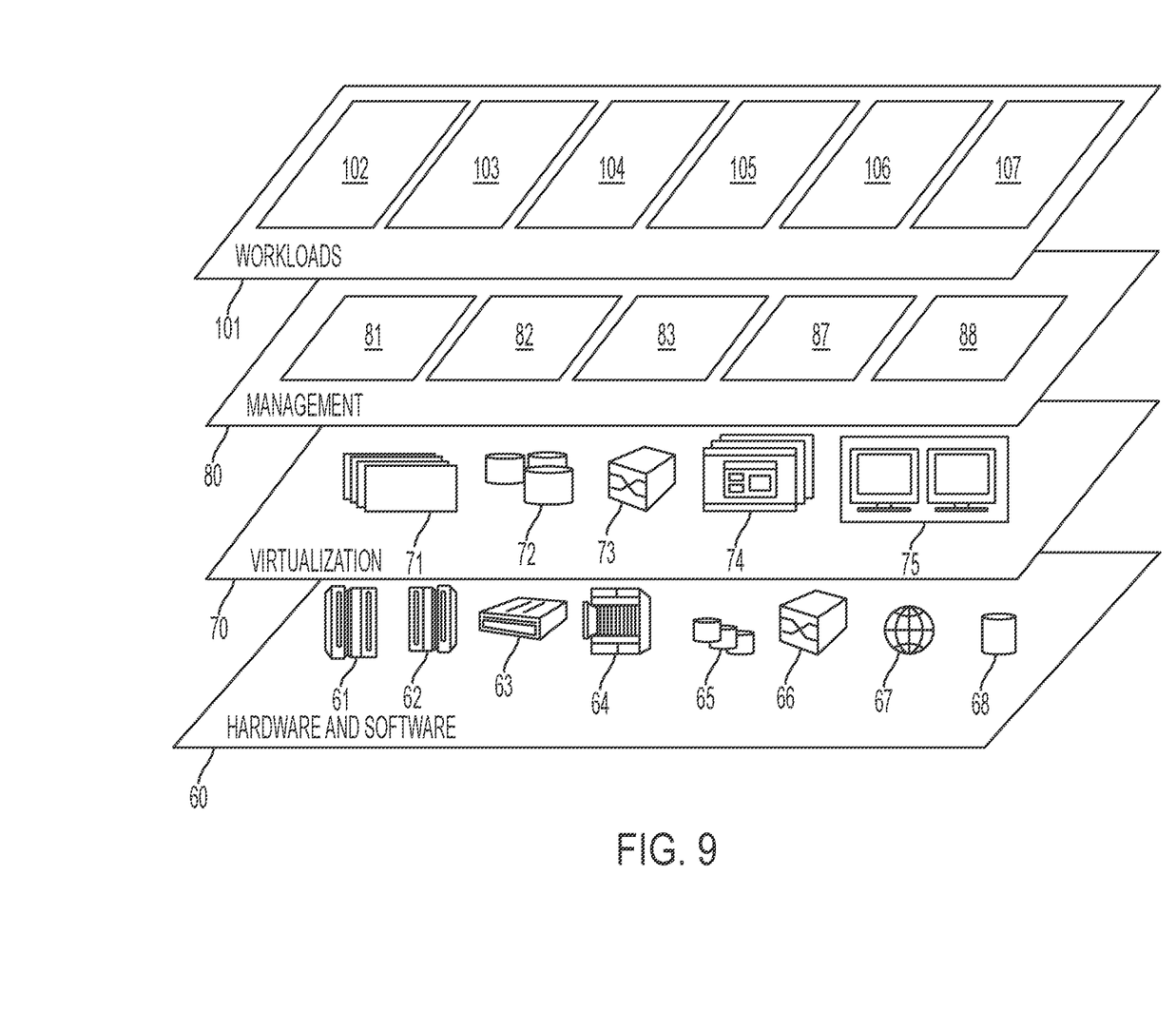
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving automotive technology by determining a parking location, directing vehicles to the parking locations, and monitoring associated vehicular movement 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
    generating, by a processor of a hardware device, a first database comprising parking locations associated with specified parking permits, parking regulations, and associated time periods;
    receiving, by said processor, parking requirement data associated with parking requirements of a driver of a vehicle at an initial location, wherein said vehicle comprises an automated self-driving vehicle;
    generating, by said processor, a second database comprising revised parking locations and GPS coordinates associated with said parking requirement data with respect to said parking locations wherein said generating said second database comprises:
        receiving, by said processor, data comprising local parking regulations, wherein said local parking regulations are associated with rules for receiving a parking citation, regulations associated with said vehicle being subject to being towed, and municipality regulations regarding allowable distances to driveways, bus stops, and fire hydrants;
        executing, by said processor, natural language processing (NLP) code with respect to said data;
        receiving, by said processor from a plurality of video retrieval devices of a plurality of vehicles, video data comprising crowd sourced images associated with said parking locations and said vehicle; and
        identifying, by said processor from said video data, signs and physical structures impacting said parking locations;
    analyzing, by said processor, said video data and said local parking regulations;
    determining, by said processor based on results of said analyzing, parking risks associated with local parking enforcement authorities;
    generating, by said processor based on analysis of said first database and said second database, recommended parking locations for said driver;
    receiving, by said processor from said driver, a selection for a first parking location of said recommended parking locations;
    directing, by said processor, said driver from said initial location to said first parking location;
    monitoring, by said processor via sensors of said vehicle, movement of said vehicle from said initial location to said first parking location;
    automatically directing and controlling, by said processor, said vehicle such that said vehicle automatically initiates motion and parks in a specified parking space at said first parking location;
    generating, by said processor based on said vehicle being parked in said specified parking space, a warning comprising a running clock associated with determining a timeframe indicating when said vehicle must be moved; and
    activating, by said processor in response to said warning, said vehicle to move itself when said specified parking space is no longer suitable for parking thereby initiating motion to a different parking location based on determined available parking locations.

2. The method of claim 1, further comprising:
    monitoring, by said processor via said sensors, said driver moving into said specified parking space at said first parking location.

3. The method of claim 1, wherein said first parking location is further determined based on calendar-based events.

4. The method of claim 1, further comprising:
    receiving, by said processor from a plurality of video retrieval devices, video data associated with said parking locations;
    analyzing said video data; and
    identifying, by said processor based on results of said analyzing, currently available parking spaces of said recommended parking locations, wherein said first parking location is selected from said currently available parking spaces.

5. The method of claim 4, further comprising:
    identifying, by said processor based on results of said analyzing, tow vehicles at said recommended parking locations, wherein said selection is further based on said identifying said tow vehicles.

6. The method of claim 4, further comprising:
    identifying, by said processor based on results of said analyzing, risk levels associated with said recommended parking locations, wherein said selection is further based on said identifying said risk levels.

7. The method of claim 6, wherein said vehicle comprises an automated self-driving vehicle, and wherein said method further comprises:
    determining, by said processor, that said risk levels exceed a specified risk level threshold; and
    automatically instructing, by said processor based on results of said determining, said vehicle such that said vehicle automatically travels to a second location of said recommended parking locations for said driver.

8. The method of claim 6, wherein said vehicle comprises an automated self-driving vehicle, and wherein said method further comprises:
    determining, by said processor, that said risk levels exceed a specified risk level threshold; and
    automatically instructing, by said processor based on results of said determining, said vehicle such that said vehicle automatically travels to a specified parking space of said first location.

9. The method of claim 6, wherein said vehicle comprises an automated self-driving vehicle, and wherein said method further comprises:
    determining, by said processor, that said risk levels exceed a specified risk level threshold; and
    automatically instructing, by said processor based on results of said determining, said vehicle such that said vehicle automatically travels within a perimeter of said first location during a first specified time period;
    additionally determining, by said processor, that said first specified time period has been exceeded; and
    notifying, by said processor based on results of said additionally determining, said driver to avoid parking at said first location.

10. The method of claim 1, further comprising:
    providing at least one support service for at least one of creating, integrating, hosting, maintaining, and deploying computer-readable code in the computing system, said code being executed by the processor to implement: said generating said first database, said receiving said parking requirement data, said generating said second database, said generating said recommended parking locations, said receiving said selection, said directing, and said monitoring.

11. A computer program product, comprising a computer readable hardware storage device storing a computer readable program code, said computer readable program code comprising an algorithm that when executed by a computer processor of a hardware device implements a method, said method comprising:

generating, by said processor, a first database comprising parking locations associated with specified parking permits, parking regulations, and associated time periods;

receiving, by said processor, parking requirement data associated with parking requirements of a driver of a vehicle at an initial location, wherein said vehicle comprises an automated self-driving vehicle;

generating, by said processor, a second database comprising revised parking locations and GPS coordinates associated with said parking requirement data with respect to said parking locations wherein said generating said second database comprises:

receiving, by said processor, data comprising local parking regulations, wherein said local parking regulations are associated with rules for receiving a parking citation, regulations associated with said vehicle being subject to being towed, and municipality regulations regarding allowable distances to driveways, bus stops, and fire hydrants;

executing, by said processor, natural language processing (NLP) code with respect to said data;

receiving, by said processor from a plurality of video retrieval devices of a plurality of vehicles, video data comprising crowd sourced images associated with said parking locations and said vehicle; and identifying, by said processor from said video data, signs and physical structures impacting said parking locations;

analyzing, by said processor, said video data and said local parking regulations;

determining, by said processor based on results of said analyzing, parking risks associated with local parking enforcement authorities;

generating, by said processor based on analysis of said first database and said second database, recommended parking locations for said driver;

receiving, by said processor from said driver, a selection for a first parking location of said recommended parking locations;

directing, by said processor, said driver from said initial location to said first parking location;

monitoring, by said processor via sensors of said vehicle, movement of said vehicle from said initial location to said first parking location;

automatically directing and controlling, by said processor, said vehicle such that said vehicle automatically initiates motion and parks in a specified parking space at said first parking location;

generating, by said processor based on said vehicle being parked in said specified parking space, a warning comprising a running clock associated with determining a timeframe indicating when said vehicle must be moved; and activating, by said processor in response to said warning, said vehicle to move itself when said specified parking space is no longer suitable for parking thereby initiating motion to a different parking location based on determined available parking locations.

12. The computer program product of claim 11, wherein said method further comprises:

monitoring, by said processor via said sensors, said driver moving into said specified parking space at said first parking location.

13. A hardware device, within a vehicle, comprising a computer processor coupled to a computer-readable memory unit, said memory unit comprising instructions that when executed by the computer processor implements a method comprising:

generating, by said processor, a first database comprising parking locations associated with specified parking permits, parking regulations, and associated time periods;

receiving, by said processor, parking requirement data associated with parking requirements of a driver of a vehicle at an initial location, wherein said vehicle comprises an automated self-driving vehicle;

generating, by said processor, a second database comprising revised parking locations and GPS coordinates associated with said parking requirement data with respect to said parking locations wherein said generating said second database comprises:

receiving, by said processor, data comprising local parking regulations, wherein said local parking regulations are associated with rules for receiving a parking citation, regulations associated with said vehicle being subject to being towed, and municipality regulations regarding allowable distances to driveways, bus stops, and fire hydrants;

executing, by said processor, natural language processing (NLP) code with respect to said data;

receiving, by said processor from a plurality of video retrieval devices of a plurality of vehicles, video data comprising crowd sourced images associated with said parking locations and said vehicle; and identifying, by said processor from said video data, signs and physical structures impacting said parking locations;

analyzing, by said processor, said video data and said local parking regulations;

determining, by said processor based on results of said analyzing, parking risks associated with local parking enforcement authorities;

generating, by said processor based on analysis of said first database and said second database, recommended parking locations for said driver;

receiving, by said processor from said driver, a selection for a first parking location of said recommended parking locations;

directing, by said processor, said driver from said initial location to said first parking location;

monitoring, by said processor via sensors of said vehicle, movement of said vehicle from said initial location to said first parking location;

automatically directing and controlling, by said processor, said vehicle such that said vehicle automatically initiates motion and parks in a specified parking space at said first parking location;

generating, by said processor based on said vehicle being parked in said specified parking space, a warning comprising a running clock associated with determining a timeframe indicating when said vehicle must be moved; and activating, by said processor in response to said warning, said vehicle to move itself when said specified parking space is no longer suitable for parking thereby initiating motion to a different parking location based on determined available parking locations.

* * * * *